US006009407A

United States Patent [19]
Garg

[11] Patent Number: 6,009,407
[45] Date of Patent: Dec. 28, 1999

[54] INTEGRATED MARKETING AND OPERATIONS DECISIONS-MAKING UNDER MULTI-BRAND COMPETITION

[75] Inventor: Amit Garg, White Plains, N.Y.

[73] Assignee: International Business Machines Corporation, Armonk, Calif.

[21] Appl. No.: 09/032,527

[22] Filed: Feb. 27, 1998

[51] Int. Cl.$^6$ .................................................. G06F 17/60
[52] U.S. Cl. .................................. 705/10; 705/7; 705/14; 705/28
[58] Field of Search .................................. 705/10, 14, 28, 705/7

[56] References Cited

U.S. PATENT DOCUMENTS

| | | | |
|---|---|---|---|
| 5,649,114 | 7/1997 | Deaton et al. | 705/14 |
| 5,687,322 | 11/1997 | Deaton et al. | 705/14 |

FOREIGN PATENT DOCUMENTS

| | | | |
|---|---|---|---|
| 010194412 | 1/1997 | Japan | B65G 001/137 |
| 009304875 | 7/1992 | South Africa . | |

OTHER PUBLICATIONS

Snap–on tools Company, "ShopKey—Shop Management", From http://www.snapondiag.com/sun/sk/sk-SM/htm, 1999.

Anderson, "The profit doctor—Business Improvement System", from htpp://www.nabl.com/members/alliance/consultant/index.html, pp. 1–4 1999.

OpenOrders, Inc. "OpenOrders Technical Architecture Overview & Web Strategy", from http://world.std.com/~custom/technology/tec.htm Jan. 1998.

Big Business, Inc. "Sale, Purchasing, Inventory, Accounting" from http:www.bibbusiness.com/bbinfo qa.html, 1995.

*Primary Examiner*—James P. Trammell
*Assistant Examiner*—Cuong H. Nguyen
*Attorney, Agent, or Firm*—Whitham, Curtis & Whitham; Stephen C. Kaufman

[57] ABSTRACT

A computer-implemented method for merging product marketing control and product inventory control, generates a segment-level consumer choice model for a plurality of competing brands, and aggregates that to a market-level consumer choice model, then generates a brand-level demand probability distribution function based on the choice models. A cost-minimized base stock level and a demand forecast for each of the plurality of brands is generated based on the market level model consumer choice model and on pricing, promotion, and other marketing data for each of the brands. An inventory control receives inventory subtraction data and inventory addition data and, using the cost-minimized base stock levels, generates orders to replenish the inventory.

10 Claims, 2 Drawing Sheets

INTEGRATED MARKETING AND OPERATIONS DECISIONS-MAKING UNDER MULTI-BRAND COMPETITION

BACKGROUND OF THE INVENTION

1. Field of the Invention

The present invention generally relates to a computer-based method for business management and, more particularly, to a computer implemented method for generating brand-specific inventory planning and ordering information, based on consumer characterization and segmentation data calculated from point-of-sale data and other market data.

2. Description of the Related Art

Researchers in the area of marketing have developed various sophisticated models for causal forecasting of demands. A subset of these causal models are employed by marketing managers to assist their devising of business strategies. One such causal model is the model of consumer choice, based largely on household panel data, which has enabled researchers to study choice behavior, brand preferences, and purchase. Consumer choice models underlie market share models, which have also been studied extensively. Market share models are viewed as useful in evaluating the competitive effects of price and promotions on market shares of each brand and involve using aggregate data at store, regional, or market level.

Terminology used for this description is in accordance with that used by persons of ordinary skill in the relevant arts and, where appropriate, is additionally defined herein. For example, from the well-known treatise Kotler, P., *Marketing Management*, 7th Edition, Prentice-Hall, Englewood Cliffs N.Y., 1991, the term marketing is defined as "the process of planning and executing the conception, pricing, promotion and distribution of ideas, goods and services to create exchanges that satisfy individual and organizational objectives. Operations management can be defined as the management of the direct resources required to produce the goods and services provided by an organization.

Various studies of the dynamic interface between marketing and operations are found in: Welam. U. P., On a Simultaneous Decision Model for Marketing. Production, and Finance, *Management Science*, 23, 9, 1977, 1005–1009; Eliashberg, J., and R. Steinberg, Marketing-Production Decisions in an Industrial Channel of Distribution, *Management Science*, 33, 8, 1987, 981–1000; Porteus, E., and S. Whang, On Manufacturing/Marketing Incentives, *Management Science*, 37, 9, 1991, 1166–1181; Rajan, A., Rakesh, and R. Steinberg, Dynamic Pricing and Ordering Decisions by a Monopolist, *Management Science*, 38, 2, 1992, 240–262; and Sogomonian, A. G., and C. S. Tang, A Modeling Framework for Coordinating Promotion and Production Decisions within a Firm, *Management Science*, 39, 2, 1993, 191–203. However, most of the previous work has studied the dynamics of the marketing-operations interface using only one product with deterministic demands. For example, the above-cited work by Porteus and Whang has considered a single-period model with multiple end-products. The cited Porteus and Whang model focuses on developing appropriate incentives to make the efforts of "selfish" marketing and operations managers result in a global optimal. Neither that model nor the other above-cited models, however, focus on interactions between different brands and the effect of competition.

Marketing forecasts of product consumption and predictions of the success of impending marketing strategies to sell a product is extremely important to operational management which base product production schedules on marketing forecasts and predictions. However, marketing is an extremely dynamic field and, therefore, a good market model for a particular product category must consider a wide range of variables to ensure the best model possible. Heretofore none of the studies or research undertaken have sufficiently brought together or proposed an integrated system which allows for inter-firm cooperation/decision-making between marketing and operational management using a complete market model which is geared toward product production and allows for multiple competitors, marketing strategies, anticipated customer consumption, interaction with like product brands, and overall market health.

Previous researchers have identified market models combining some features of what is termed as a micro-level analysis, which is based on direct survey-type consumer choice data, with what is termed as a macro-level analysis, which is based on aggregate data-based market share information. One example is Russell, G. J., and W. A. Kamakura, Understanding Brand Competition using Micro and Macro Level Scanner Data, *Journal of Marketing Research*, 31, 1994, 289–303, (the Russell, et al., Understanding Brand Competition model). There are, however, shortcomings in this method. One is that it does not consider or model linkage between marketing management and the manufacturing/inventory operations of the firm. Another, as will be understood to one of ordinary skill from the description of the present invention below, is that the Russell, et al., Understand Brand Competition Model does not allow its explanatory or marketing mix variables to be selected as Multi-nominal Logit (MNL) or Multiplicative Competitive Interaction (MCI) variables. Instead, that model sets all of its explanatory or marketing mix variables as MNL variables.

SUMMARY OF THE INVENTION

It is an object of this invention to provide an integrated system for joint decision making between the Marketing and Operations branches of a firm competing under multi-brand competition.

It is another object of this invention to provide a forecast model to aid in communication between marketing and operations.

It is another object of this invention to provide a model which integrates consumer choice and market share.

The model defined by the subject invention is more comprehensive than those described above. The invention models a firm in a competitive market comprising several firms selling products within a category. A firm in this market could sell one or more brands of products within this category. Each customer in this market belongs to one of the several segments based on his/her purchasing behavior. Firms employ different promotional and pricing strategies for the brands they sell. The invention assumes each firm knows the total size of the market for this category and is responsible for its promotion and pricing strategies. A firm's pricing and promotion strategy will affect its relative market share (and profit) but will not affect total category sales. According to the invention, first a market in which each firm has perfect information about its competition is modeled, and then generalized to a case of imperfect information.

In addition to inter-firm interactions resulting from competition, the invention also models intra-firm interactions. It is assumed that the firm consists of two divisions, marketing and operations, and that it operates in a decentralized mode. Therefore, marketing and operations divisions make independent decisions. The marketing division of a firm determines pricing and promotion strategies in order to increase market share (and/or profits). The impact of pricing, promotions and competitors actions is determined by the market share model that generates a causal demand forecast for each brand. The link between the two divisions is this causal demand forecast. Operations division uses this causal forecast to determine the stocking levels for each brand it manufactures. The invention assumes the operations division operates under a make-to-stock policy. It is also assumed that the operations division has sufficient capacity to meet demands for each brand in every period.

The marketing model summarized above is used to obtain causal demand forecasts for each brand, and its related decision making for inventory control. Decision-making within a business is, ideally, according to and is based on the decision-maker having perfect, i.e., perfectly complete, accurate, and near-instant, information on all facts described above for the competitive environment. Frequently, however, the decision-maker has imperfect information. For example, much of the information defining competitors' business operations and strategies is not directly available to the decision-maker. The information must instead come through information gathering entities, or be estimated based on what is available. The present invention, as will be understood from this description, is directed to both perfect and imperfect information environments.

The embodiments of this invention comprise a distributed sensor and computer-implemented method which forms a marketing model that integrates micro-level analysis required of a consumer choice model with macro-level analysis required of a market share model, with additional features, functions and performance aimed in part on the shortcomings of the Russell et al Understanding Brand Competition model identified hereinabove.

In a first embodiment, information about brand promotions and pricing are stored in a data base which may be updated by a market conditions sensor. The market conditions sensor gathers information about the product market, the information including competitor strategies and other facts having known effect on the market. These facts are gathered from various sources such as news sources and market watch companies. A consumer segmentation module receives the brand promotion and pricing database as well as information from point of sale (POS) sensors. The customer segmentation module feeds into the database which contains segment-level characteristics by brand, which in turn updates the segment-level consumer choice model.

Segment-level consumer choice data from the consumer choice model and data from a market-level brand sales sensor are read in to a market-level consumer choice model. The Market-level brand sales sensor provides information about brand sales of each brand in the market for estimating accurate market share for each brand, allowing a sales forecast for the firms' own brand. Data from the market-level consumer choice model is read into the characteristic brand-level demand distribution. A policy for brand-level replenishment is computed using data from characteristic brand-level demand distribution and brand unit cost data base. A module analyzes the performance of the replenishment policy. An inventory control process receives data from a point of sale sensor, a replenishment order generator system and an order receipt sensor. Using the computed brand level replenishment policy and data from the inventory control process, a replenishment order is generated and transmitted to an order transmit sensor. Order receipt is transmitted back to the inventory control process via the order receipt sensor.

An operations management system is supplied with brand-level replenishment policy data, replenishment policy performance analysis data and inventory control process data. The operations management system also maintains a data exchange with the marketing decisions management system. The marketing decisions management system is supplied with necessary data from the market conditions sensor, the demand forecast by brand sensor, the consumer segmentation module, segment-level characteristic by brand data base, and segment-level consumer choice model.

The embodiment provides a computer-based intra-firm decision making process, wherein a marketing division receives gathered information about consumer segment characteristics and competitor strategy. The method forms a segment-level consumer choice model based on the gathered information, and forms a firm segment-level strategy based on that consumer choice model. The method then forms a market-level brand choice model based on the segment-level consumer choice model and on an updated characteristic brand-level demand distribution. The method's marketing division communicates to operations division with distribution characteristics, while an operations division updates the segment-level demand distribution with inventory stock levels. Using distribution characteristics from marketing operations and inventory service level requirements, the method then generates inventory replenishment decisions, which result in inventory policy parameters.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
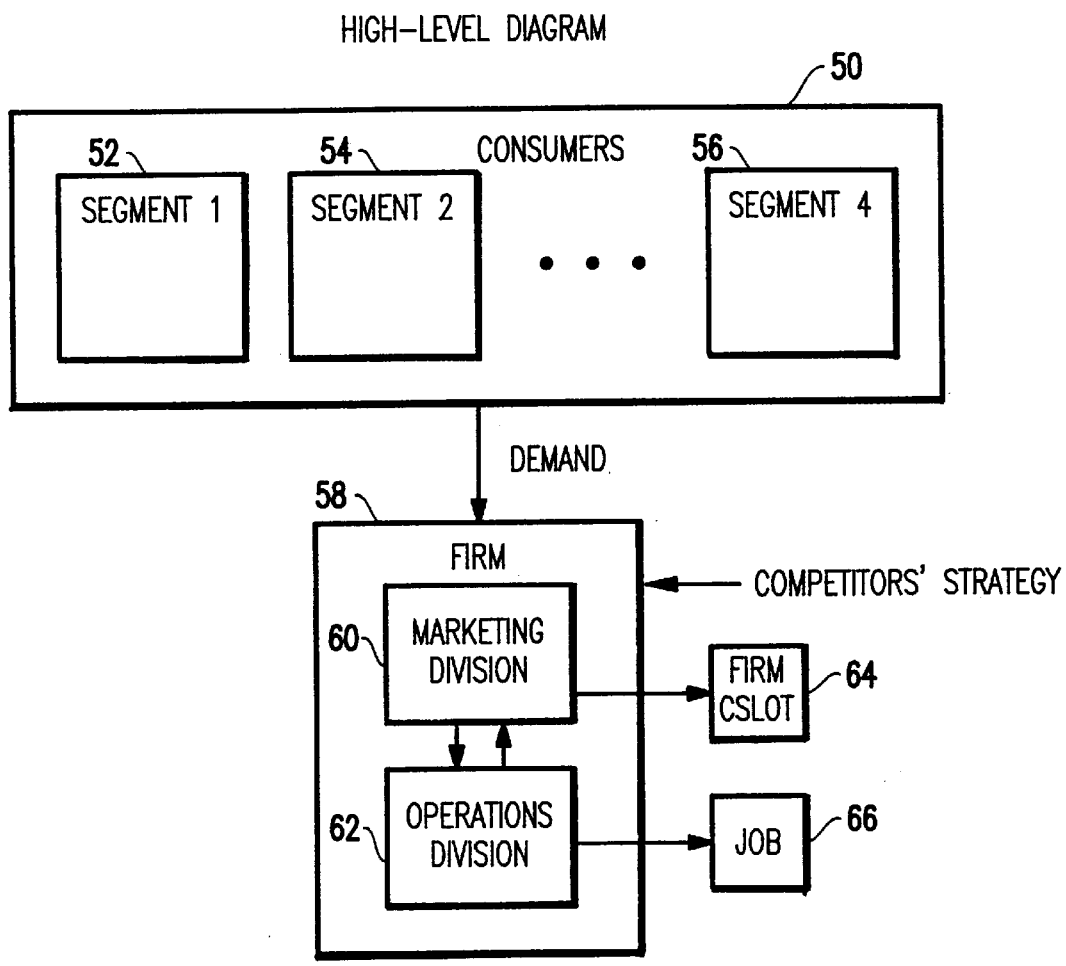
FIG. 1 is a diagram of the high level order of the invention.

A first embodiment of this invention assumes that purchases of a brand by each household follow a Poisson distribution. Let $X_{ih}$ be the weekly quantity of brand i purchased by households belonging to segment h. Since purchases of each consumer within the segment follow a Poisson distribution, total weekly purchases of brand i by consumers in segment h, $X_{ih}$, also has a Poisson distribution with mean $$\lambda_{ih} = \lambda_h S_{ih} \qquad (1)$$

where $\lambda_h$ is a measure of the overall weekly quantities purchased by consumers in segment h, and $S_{ih}$ is the relative market share of brand i in segment h. Relative market share of a brand with a segment can be expressed as:

$$S_{ih} = \frac{A_{ih}}{\sum_{j=1}^{B} A_{ih}}, i = 1, \ldots B; h = 1, \ldots, H, \qquad (2)$$

where $A_{ih}$ is the attraction of brand i to consumers in segment h.

The attraction of a brand within a segment can be expressed as $$A_{ih} = \exp(\alpha_i + \epsilon_{ih}) \prod_K^{k=1} \prod_B^{j=1} f_k(X_{kj})^{\beta_{kij}^{(h)}} \quad (3)$$

where:

$\alpha_i$ is the constant attraction of brand i assumed to be independent of the segment;

$\epsilon_{ih}$ is the error term;

$X_{kj}$ is the value of the kth explanatory variable or the marketing mix variable for brand j (e.g., price for brand j);

$\beta_{kij}^{(h)}$ is the parameter to be estimated; and $f_k(.)$ is a monotone transformation of the explanatory variable, $X_{kj}$ Of course, it is expected that $$\sum_{i=1}^{B} S_{ih} = 1.$$

The model defined above is very general. Further, the model allows for asymmetric cross-competitive influences of other brands available in the market. In addition, the monotonic transformation function $f_k(.)$ permits an explanatory variable to be a Multi-nominal Logit(MNL) or a Multiplicative Competitive Interaction (MCI) variable. Therefore, if $f_k(X_{kj})=X_{kj}$, $X_{kj}$ is MCI, while $X_{kj}$ is MNL if $f_k(X_{kj})=\exp(X_{kj})$. Given the segment-level model defined above, its properties will be described.

First, for characterization and analysis of the market and competitive structures within segment h, the direct and cross market-share elasticities are calculated. Let $es_{ij}^{(h,k)}$ be the market-share elasticity in segment h for brand i due to changes in the marketing mix variable, $X_{kj}$ caused by brand j's actions.

$$es_{ij}^{(h,k)} = \begin{cases} \beta_{kij}^{(h)} - \sum_{l=1}^{B} S_{ih} & \text{if } X_{kj} \text{ is MCI,} \\ \left(\beta_{kij}^{(h)} - \sum_{l=1}^{B} S_{ih}\right) X_{kj} & \text{if } X_{kj} \text{ is MNL,} \end{cases} \quad (4)$$

Elasticity expressions in the equation (4) can be re-written as follows to analyze competitive effects.

$$es_{ij}^{(h,k)} = \begin{cases} (1-s_{ih})\beta_{kij}^{(h)} - s_{hj}\beta_{kij}^{(h)} - \sum_{l \neq i,j}^{B} s_{lh}\beta_{klj}^{(h)}, & \text{if } X_{kj} \text{ is MCI,} \\ \left((1-s_{ih})\beta_{kij}^{(h)} - s_{hj}\beta_{kij}^{(h)} - \sum_{l \neq i,j}^{B} s_{lh}\beta_{klj}^{(h)}\right) X_{kj}, & \text{if } X_{kj} \text{ is MNL,} \end{cases} \quad (5)$$

In equation (5), the first term on the right-hand side represents the direct competitive effect of brand j's actions on the market share of brand i. The second term represents the indirect effect of brand i's actions on the market share of brand i, while the third term represents the indirect competitive effect due to all other brands.

In addition, the total market-share elasticities can be expressed as functions of the segment level market-share elasticities derived above.

$$e_{ij}^{(k)} = \sum_{h=1}^{H} q_h es_{ij}^{(h,k)} \quad (6)$$

where $q_h$ is the expected relative volume of segment h. $q_h$ can be expressed as $$q_h = \frac{\lambda_h}{\sum_{g=1}^{H} \lambda_g} \quad (7)$$

The marketing model derived thus far assumes that each firm knows the levels of the marketing mix variables (or the explanatory variables) for all brands. This would be true in a market which has perfect information. Under this assumption of perfect information, the following example sequence of events and assumptions during a given period is defined.

First, all firms make their promotion, pricing, and other decisions that affect their market shares, independent of one another. These decisions are then made public. In addition, an outstanding order that was scheduled to arrive in that period is received, operations division makes its ordering decision, demands are observed, and finally at the end of the period, inventory holding costs are assessed.

The key linkage between the causal demand model described above and the inventory model is a characterization of the distribution of demands for each brand. This characterization is derived by first aggregating the segment-level model to construct a market-level model. Let $z_i$ be the total weekly sales of brand i, therefore, $$z_i = \sum_{h}^{H} x_{ih}.$$

Also define $Y_i$ to be the market share of brand i, i.e., $$y_i = \frac{z_i}{\sum_{j=1}^{B} z_j}, \quad (8)$$

Defining m as the total category sales in the market, obtained from market information sources, and $Y_i$ as the market share of each brand, the following set of properties 1.1 through 1.4, collectively referenced hereinafter as "Property 1", apply to the method and operation of the present invention:

Property 1.1:

Assuming individual household purchases follow a Poisson distribution, the market share of each brand, $y_i$, conditioned on total category sales, m, has a multinomial distribution with mean $P_i$ of:

$$p_i = \sum_{h}^{H} q_h s_{ih}, \quad (9)$$

$$\text{where } \sum_{j=1}^{B} p_i = 1$$

Property 1.2:

The joint distribution of demands for each brand is multinomial with pdf given by $$P(Z_1 = n_1, Z_2 = n_2, \ldots, Z_B = n_B | m) = \frac{m!}{n_1! n_2! \ldots n_B!} p_1^{n_1} p_2^{n_2} \ldots p_B^{n_B} \quad (10)$$

$$\text{where } \sum_{j=1}^{B} n_j = m$$

Property 1.3:
The covariance of demands for each brand is given by:

$$Cov(Z_i, Z_j | m) = \begin{cases} -mp_i p_j, & \text{if } i \neq j; \\ mp_i(1 - p_i), & \text{otherwise,} \end{cases} \quad (11)$$

Property 1.4:
The marginal distribution of brand i given the total sales in the category is binomial with parameters m and $P_i$, i.e., $$P(Z_i = n_i | m) = \frac{m!}{n_1!(m - n_1)!} p_i^{n_i}(1 - p_i)^{m - n_i}. \quad (12)$$

Proofs of these properties 1.1 through 1.4 making up Property 1 are straightforward to one of ordinary skill, and a presentation here is not necessary for an understanding of this invention and, hence, these proofs are omitted.

Given the characterization of demands defined by Property 1, the optimal base-stock levels can be computed. There are two possible cases. The first is to jointly determine the base-stock levels for each brand in the market, and the second is to determine the base-stock levels for a given firm.

The objective of each brand manager is to stock the minimum amount of inventory required to satisfy customer service requirements represented by fill rates. It is assumed, for purposes of this description, that the fill rates for all brands are the same. Further, since demands for brands are correlated, one cannot determine base-stock levels for each brand independently. The resulting problem for determining the base-stock levels can, however, be formulated according to the following non-linear program, (P):

$$(P): \min \sum_{i=1}^{B} h_i I_i(S_i) \quad (13)$$

with P subject to the following:

$$P(S_i \geq z_i = 1, \ldots, B | m) \geq \alpha \quad (14)$$

where $h_i$ is the unit holding cost per period for items of brand i, $I_i(S_i)$ is the average on-hand inventory of brand i, and is a function of base-stock level, $S_i$ of the brand, and $\alpha$ is the fill-rate requirement for the brands. The joint probability function in constraint (14) can be computed using Property 1. Optimal base-stock levels can be computed using a simple search procedure.

The relationship between the average on-hand inventory for a brand and its base-stock level will now be derived.

Average inventory on hand at the beginning of the period after the ordering decision has been made, but before any demands are observed, is $S_i$. Average on-hand inventory at the end of a period is $S_i - mp_i$. Therefore, average on-hand inventory in a period for brand i, $I_i(S_i)$ can be written as $I_i(S_i) = S_i - mp_i/2$ Therefore, the non-linear programming problem, (P), can be re-written as:

$$(P'): \min \sum_{i=1}^{B} h_i \left( S_i - \frac{mp_i}{2} \right) \quad (15)$$

subject to equation (14).

The procedure for determining the base-stock level of brands belonging to the firm is similar to the determination of base-stock levels for all brands. The results of determining the base-stock levels for all brands will apply once the marginal distribution of brands belonging to the firm, i.e., for $i \in F$, is obtained, where F is the set of brands belonging to the firm. To that end, defined $$p' = 1 - \sum_{i \in F} p_i \text{ and } n' = m - \sum_{i \in F} n_i.$$

For example, if the market is multinomial distribution, the marginal distribution of brands belonging to the firm is given by:

$$P(Z_i = n_i, i \in F | m) = \frac{m!}{n_i! \prod_{i \in F} n_i} p'^{n'} \prod_{i \in F} p_i^{n_i}. \quad (16)$$

One of ordinary skill can now set up the optimization problem similar to problem (P') to determine base-stock levels for items belonging to the firm.

An inventory model under imperfect information is a generalization of the perfect information case and is more realistic because firms usually do not know the exact strategy their competitors will adopt. Uncertainty in firms' actions can be modeled by associating a probability distribution with each marketing mix variable, $X_{kj}$. Define X to be the K x X matrix of the marketing mix variables, and $\Phi(X)$ be their joint cumulative density function. Therefore, it is readily seen that the relative attraction of the brand (equation (3)) and its market share (equation (2)) are random variables. Analysis used in consumer choice and market share models can be applied to this case by replacing the expressions for $S_{ih}$ by its expected value, $Es_{ih}$. In order to do so, however, it is necessary to show that $$\sum_{i=1}^{B} Es_{ih} = 1.$$

This can be proved using Fubini's Theorem.

FIG. 1 shows the high-level order of the invention wherein the consumers 50 are divided into segments 52, 53, 56 based on buying habits. The firm 58 has a marketing division 60, and an operations division 62 which communicate with one another.

Figure 2:
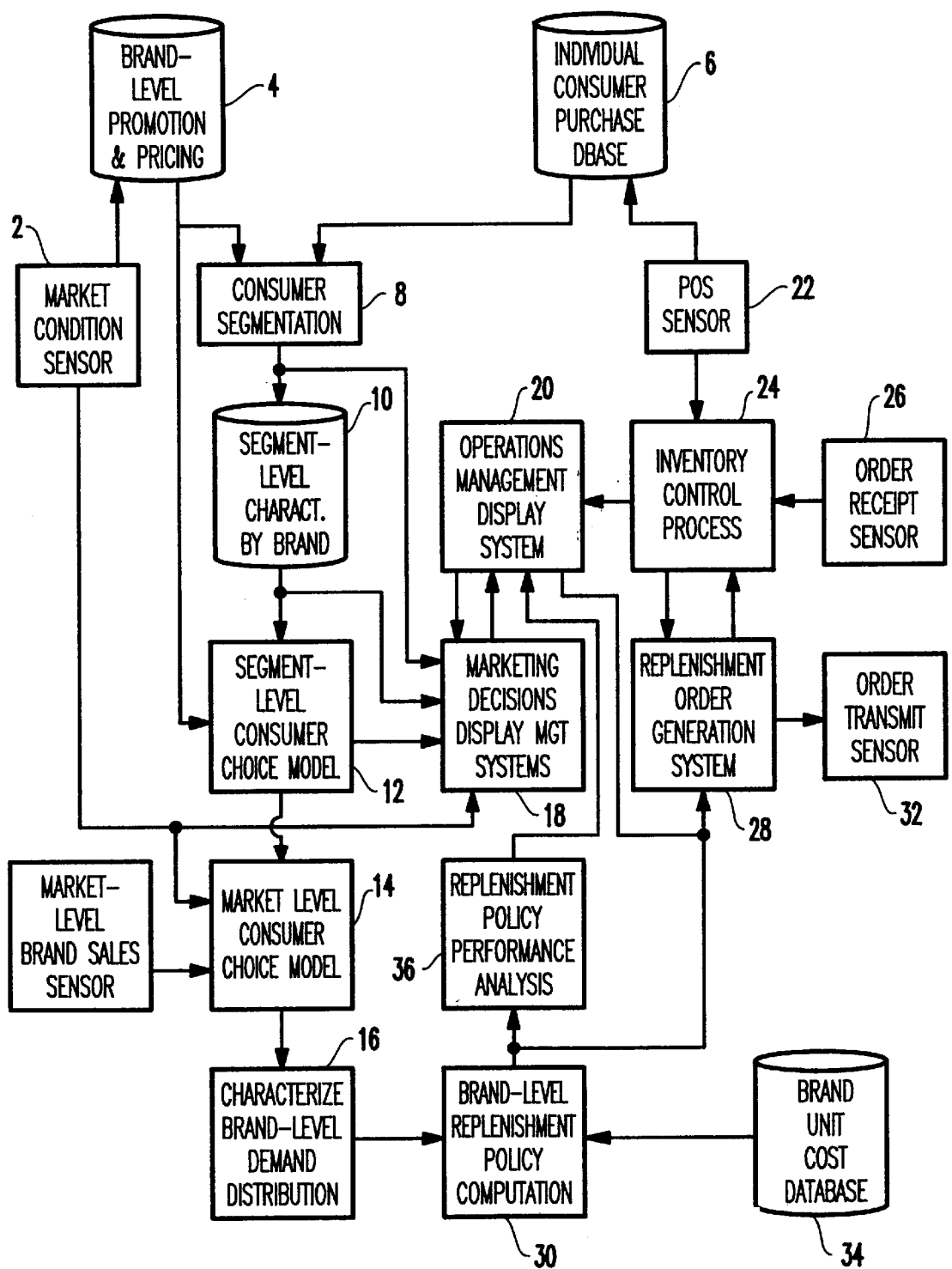
FIG. 2 is a block diagram of a computer-based system.

FIG. 2 shows an example computer implementation of the above-described present invention. Referring to FIG. 2, the Market Conditions Sensor 2 comprises various sources of gathering market information, such as market intelligence from information companies. Information from the Market Conditions Sensor 2 is input to the Brand-level Promotion and Pricing Database 4, as well as to the Market-level Consumer Choice Model 14 and the Market Decisions Display Management System 18, which are described further below. The Brand-level Promotion and Pricing Database 4 is a repository of historical as well as planning data for promotion campaigns and pricing for each brand. Examples of promotion campaigns are displays, rebates, and coupons. The Market Condition Sensor 2 may also report other facts affecting a market, such as bad weather, which affects sales of snow shovels or bathing suits, and facts such as gasoline prices and labor strikes, which affect various related markets.

Individual customer-level transactions are stored in the Individual Consumer Purchase Database 6 and, together with the brand-level promotion and pricing data from the database 4, are utilized by the Consumer Segmentation Module 8 for grouping the consumers into a plurality of segments. The segments are indexed as h in Equations (1) through (3) and elsewhere above. The Consumer Segmentation Module 12 consists of one or more methods for segmenting the customers into the plurality of segments. Many such methods are well-known in the related art and, therefore, a discussion of these is not necessary for an understanding of the present invention. For purposes of example, one such known method for segmentation is data mining.

After the consumer segmentation is performed, the Consumer Segmentation module 8 generates estimated values for use as the parameters of Equation (3) above, which are used by the Segment-level Consumer Choice Model module 12 described below. Results from the Consumer Segmentation module 8 are stored in the Segment-level Characterization by Brand Database (or database module) 10. The Segment-level Consumer Choice Model module 12 is a computer implementation of Equations (2) and (3) above, and receives parameter values for Equation (3) from the Segment-level Characteristics by Brand module 14, as stated above. The Segment-level Consumer Choice Model module 12 receives the levels of the marketing mix variables $X_{kj}$ from the Brand-level Promotion and Pricing Database 4 and also through a graphical unit interface (GUI) (not shown) from marketing personnel.

The calculated result of the Segment-Level Consumer Choice Model module 12, i.e., of Equations (2) as (3), is a demand forecast for a brand in relation to a particular consumer segment.

Referring to FIG. 2, the Market-level Consumer Choice Model module 14 implements the result of aggregating a plurality of segment-level consumer choice models from module 12, according to Equation (8) above, with market-level brand sales data from the market sensor 13 for establishing the total category sales represented by the variable m of Property 1, as described above. The market sensor 13 could, for example, be realized as outside market information sources. The results of the Market-level Consumer Choice Model of module 14 are used by the Characterize Brand Level Distribution Module 16, which carries out the characterization as described for Property 1 above.

As shown by the FIG. 2 example, outputs generated by the segment-level consumer choice model of module 12 is also displayed by the Marketing Decisions Display Management System 18. The Marketing Decisions Display Management System 18 is a user interface such as, for example, a graphical user interface (GUI), used to input data and to review result of the various models defined by the equations above, and described in reference thereto. The Marketing Decisions Display Management System, or interface, 18 also has linkages with the Operations Management Display System 20 which, as described below, is a graphical user interface for displaying inventory data and inventory replenishment data.

Referring to FIG. 2, the inventory operations of the merged system of the present invention is carried out as follows.

The Point-Of-Sales Sensor (POS Sensor) 22 tracks the sales transactions at each store (not shown), or other retail sales outlet, in a network (not shown) and provides this information to the Individual Consumer Purchase Database 6 and to the Inventory Control Process 24, which is described more fully below. The hardware and operation of POS Sensor systems is well known in the art and, therefore, a detailed description of the POS Sensor 22 is omitted here. The Inventory Control Process 24 tracks the inventory of each brand and each location in the network. Referring to FIG. 2, the Inventory Control Process 24 updates its inventory data (not numbered) when sales data is received from the POS Sensor 22, and when information representing new shipments from suppliers is received from the FIG. 2 Order Receipt Sensor 26. More particularly, the Order Receipt Sensor 26 informs the Inventory Control Process 24 of shipments from suppliers. The Order Receipt Sensor 26 is and/or receives and generates signals representing, for example, an Advance Shipping Notice, a fax, an actual shipment arrival or an Electronic Data Interchange (EDI) system (not shown).

The Replenishment Order Generation System 28 generates orders for goods, based on received information from the Inventory Control Process 24 and on replenishment policy parameters (not numbered) received from the Brand-level Replenishment Policy Computation module 30, which is more fully described further below. The Replenishment Order Generation System 28 order information (not numbered) is transmitted to suppliers or to intermediary suppliers by the Order Transmit Sensor 32. There are various hardware implementations of the Order Transmit Sensor 32 including, for example, a system similar to the POS Sensor 22 described above.

The Brand-level Replenishment Policy Computation module 30 is a computer implementation of the mathematical optimization problems P and P' described by Equations (13) through (15) above. The computation of optimal brand-level policy parameters by the module 30 is based on brand-level unit costs stored (not numbered) stored in the depicted Brand-level Unit Cost Database 34 and on a characterization of the demand distribution from the Characterize Demand Distribution module 16, which is described above. As shown by the example embodiment depicted by FIG. 2, results of the policy parameter computation by the module 30 can be viewed on the Operations Management Display System 20.

An additional feature contemplated by this invention, which is shown by FIG. 2, is that the, brand-level inventory policy parameters generated by the Brand-level Replenishment Policy Computation module 30 can be analyzed by, for example, a module such as the depicted Replenishment Policy Performance Analysis module 36. The Replenishment Policy Performance Analysis module 36 may, for example, analyze the impact of different levels of the inventory policy parameters on such measures of performance as average inventory levels, represented as $S_i$ by Equations (13) through (15) above, back order levels, and fill rates.

While the invention has been described in terms of its preferred embodiments, those skilled in the art will recognize that the invention can be practiced with modification within the spirit and scope of the appended claims.

Having thus described my invention, what I claim as new and desire to secure by Letters Patent is as follows:

1. A computer-implemented method for merged marketing management and inventory management, said method comprising the steps of:

(a) inputting a consumer preference data representing consumer survey information as to a preference toward each of a plurality of brands of competing goods, by each of a plurality of consumer segments;

(b) inputting a plurality of pricing information representing a corresponding price for each of said plurality of brands;

(c) inputting a plurality of promotions data characterizing marketing promotions relating to said plurality of brands;

(d) producing a segment-level consumer choice model relating said plurality of competing brands and said plurality of consumer segments, comprising sub-steps of:

(1) inputting a plurality of data $\lambda_h$, for h=1 to H, each representing a total amount of purchases over a time period by consumers within a corresponding hth segment of a plurality of H consumer segments;

(2) calculating a plurality of data, $A_{ih}$, for i=1 to B and for h=1 to H, each representing an attraction of each of a plurality of B brands to each of said plurality of H consumer segments, said calculating based in part on said consumer preference data;

(3) calculating a plurality of relative market share data, $S_{ih}$, for i=1 to B and for h=1 to H, each representing a relative market share of each of said plurality of B brands relative to the remainder of said plurality of B brands in each of said plurality of H consumer segments, said calculating based on at least one of said data $A_{ih}$; and (4) generating a plurality of mean purchase data, $\lambda_{ih}$, for i=1 to B and for h=1 to H, each of said data representing a mean of purchases of each of said plurality of B brands by consumers in each of said plurality of H segments, said generating based on said data $\lambda_h$;

$$A_{ih}(\text{attraction data}) = \exp(\alpha_i + \epsilon_{ih}) \prod_{K}^{k=1} \prod_{B}^{j=1} (f_k(X_{kj}))^{\beta_{kij}^h}$$

where: $\alpha_i$ is an attraction of brand i to said plurality of consumer segments, $\alpha_i$ being based on said consumer preference data, $\epsilon_{ih}$ is a predetermine error term, $X_{kj}$ is a kth of a plurality of marketing mix variables for brand j, said plurality based on at least one of said plurality of pricing information data and said plurality of promotions data, $\beta_{kij}^h$ is a parameter to be estimated, and $f_k(.)$ Is a predetermined monotone transformation of the marketing mix variable $X_{kj}$, then, a relative market share data, $$S_{ih} = A_{ih} \bigg/ \sum_{j=1}^{B}(A_{ih}), \text{ where } i = 1 \text{ to } B \text{ and } h = 1 \text{ to } H,$$

representing a relative market share of brands B relative to the remainder of brands B in each consumer segment H, (e) generating a brand-level demand forecast data based on said segment-level consumer choice model, each of said output data being a demand forecast for a particular brand from among said plurality of brands in relation to a particular consumer segment from among said plurality of segments, said generating further based, in part, on said pricing data and said promotions data;

(f) generating a market-level consumer choice model by aggregating the segment-level model generated at step (d) over the plurality of segments;

(g) inputting a total period sales data representing, for each of said plurality of brands, a total sales over a given market over a given period of time;

(h) generating a market share data representing, for each of said plurality of brands, a market share in relation to the remainder of said brands, based on said total period sales data;

(i) characterizing a brand-level distribution of demand for each of said plurality of brands, said characterizing comprising sub-steps of:

(1) calculating a mean of a market share of each said plurality of brands, based on said relative market share data, (2) calculating a joint probability distribution of demands for said plurality of brands, conditional on said total period sales data, (3) calculating a marginal distribution of each of said plurality of brands, based on said mean calculated by step (i)(1) and said total period sales;

(j) inputting a plurality of brand unit cost data; and (k) generating a plurality of inventory base stock level data, said data representing an optimal base stock level for a store inventory of each brand in the market, said generating based on said characterizing a brand-level distribution for each of said plurality of brands and on said brand unit cost data.

2. A computer-implemented method for merged marketing management and inventory management according to claim 1, further comprising steps of:

(1) receiving an inventory subtraction data representing a removal of units from an inventory of said plurality of brands;

(m) receiving an inventory addition data representing an addition of units to said inventory;

(n) generating an order data representing an order for a quantity of units of said plurality of brands for maintaining an inventory level in said inventory of at least one of said plurality brands, said generating based on said inventory base stock level data, said inventory subtraction data, and said inventory addition data.

3. A computer-implemented method for merged marketing management and inventory management according to claim 1, further comprising the step of generating a policy performance data representing performance value of the plurality of inventory base stock level data based on a plurality of predetermined metrics.

4. A computer-implemented method for merged marketing management and inventory management according to claim 1, further comprising the step of displaying said brand-level demand forecast data.

5. A computer-implemented method for merged marketing management and inventory management according to claim 1, wherein the sub-step (1) of the step (d) of producing a segment-level consumer choice model calculates said plurality of attraction data, $A_{ih}$, for i=1 to B and for h=1 to H, in accordance with:

$$A_{ih} = \exp(\alpha_i + \epsilon_{ih}) \prod_K^{k=1} \prod_B^{j=1} f_k(X_{kj})^{\beta_{kij}^{(h)}}$$

where $\alpha_i$ is an attraction of brand i to said plurality of consumer segments, $\alpha_i$ being based on said consumer preference data, $\epsilon_{ih}$ is a predetermined error term, $X_{kj}$ is a kth of a plurality of marketing mix variables for brand j, said plurality based on at least one of said plurality of pricing information data and said plurality of promotions data, $\beta_{kij}^{(h)}$ is a parameter to be estimated, and $f_k(.)$ is a predetermined monotone transformation of the marketing mix variable, $X_{kj}$, and wherein the sub-step (2) of the step (d) of calculating a segment-level consumer choice model calculates said relative market share data, $S_{ih}$, for i=1 to B and for h=1 to H, in accordance with:

$$S_{ih} = \frac{A_{ih}}{\sum_{j=1}^{B} A_{ih}}, \; i = 1, \ldots B; h = 1, \ldots, H,$$

6. A computer-implemented method for merged marketing management and inventory management according to claim 1, wherein step (e) of generating a brand-level demand forecast data based on said segment-level consumer choice model comprises the sub-step of generating a market share elasticity data in accordance with:

$$es_{ij}^{(h,k)} = \begin{cases} \beta_{kij}^{(h)} - \sum_{l=1}^{B} S_{lh} & \text{if } X_{kj} \text{ is } MCI, \\ \left(\beta_{kij}^{(h)} - \sum_{l=1}^{B} S_{lh}\right) X_{kj} & \text{if } X_{kj} \text{ is } MNL, \end{cases}$$

where

MNL means Multi-nominal Logit,

MCI means Multiplicative Competitive Interaction variable, $X_{kj}$ is a kth of a plurality of marketing mix variables for brand j, said plurality based on at least one of said plurality of pricing information data and said plurality of promotions data, and $\beta_{kij}^{(h)}$ is a parameter to be estimated.

7. A computer-implemented method for merged marketing management and inventory management according to claim 1, wherein step (e) of generating a brand-level demand forecast data based on said segment-level consumer choice model comprises the sub-step of generating a market share elasticity data in accordance with:

$$es_{ij}^{(h,k)} = \begin{cases} (1-s_{ih})\beta_{kij}^{(h)} - s_{hj}\beta_{kij}^{(h)} - \sum_{l \neq i,j}^{B} S_{lh}\beta_{klj}^{(h)}, & \text{if } X_{kj} \text{ is } MCI, \\ \left((1-s_{ih})\beta_{kij}^{(h)} - s_{hj}\beta_{kij}^{(h)} - \sum_{l \neq i,j}^{B} S_{lh}\beta_{klj}^{(h)}\right) X_{kj}, & \text{if } X_{kj} \text{ is } MNL, \end{cases} \quad (20)$$

where MNL means Multi-nominal Logit,

MCI means Multiplicative Competitive Interaction variable, $X_{kj}$ is a kth of a plurality of marketing mix variables for brand j, said plurality based on at least one of said plurality of pricing information data and said plurality of promotions data, and $\beta_{kij}^{(h)}$ is a parameter to be estimated.

8. A computer-implemented method for merged marketing management and inventory management according to claim 6, wherein the step (e) of generating a brand-level demand forecast data based on said segment-level consumer choice model further comprises the sub-step of generating a total market share elasticity data in accordance with:

$$e_{ij}^{(k)} = \sum_{h=1}^{H} q_h es_{ij}^{(h,k)}$$

where $q_h$ is an expected relative volume of segment h, calculated according to:

$$q_h = \frac{\lambda_h}{\sum_{g=1}^{H} \lambda_g}$$

9. A computer-implemented method for merged marketing management and inventory management according to claim 1, wherein the step (k) of generating a plurality of inventory base stock level data generates said data based on a non-linear program P, in accordance with:

$$(P): \min \sum_{i=1}^{B} h_i I_i(S_i)$$

subject to $$P(S_i \geq Z_i = 1, \ldots, B | m) \geq \alpha$$

where $h_i$ is a predetermined unit holding cost per period for items of brand i, $I_i(S_i)$ is a pre-calculated average on-hand inventory of brand i, and $\alpha$ is a fill-rate requirement for the brands i.

10. A computer-implemented method for merged marketing management and inventory management according to claim 1, wherein the step (k) of generating a plurality of inventory base stock level data generates said data based on a non-linear program P', in accordance with:

$$(P'): \min \sum_{i=1}^{B} h_i \left(S_i - \frac{mp_i}{2}\right)$$

subject to $$P(S_i \geq Z_i = 1, \ldots, B | m) \geq \alpha$$

where $h_i$ is a predetermined unit holding cost per period for items of brand i and $S_i$ is the base stock level for brand i, and $\alpha$ is a fill-rate requirement for the brands i.

* * * * *